United States Patent
Brown et al.

(10) Patent No.: US 7,143,286 B2
(45) Date of Patent: *Nov. 28, 2006

(54) DIGITAL CERTIFICATES

(75) Inventors: Richard Brown, Bristol (GB); Marco Casassa Mont, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 885 days.

This patent is subject to a terminal disclaimer.

(21) Appl. No.: 10/075,380

(22) Filed: Feb. 15, 2002

(65) Prior Publication Data

US 2002/0116367 A1 Aug. 22, 2002

(30) Foreign Application Priority Data

Feb. 17, 2001 (GB) ................................. 0103969.2

(51) Int. Cl.
*G06F 9/00* (2006.01)
*G06F 7/00* (2006.01)
*H04L 9/00* (2006.01)

(52) U.S. Cl. .................... 713/156; 713/175; 705/76; 726/5; 380/30

(58) Field of Classification Search ................. 713/156; 705/76
See application file for complete search history.

(56) References Cited

U.S. PATENT DOCUMENTS

| | | | | |
|---|---|---|---|---|
| 5,311,591 A | * | 5/1994 | Fischer | 713/156 |
| 5,412,717 A | * | 5/1995 | Fischer | 713/156 |
| 5,579,479 A | | 11/1996 | Plum | 395/188.01 |
| 5,659,616 A | * | 8/1997 | Sudia | 705/76 |
| 5,877,485 A | | 3/1999 | Swartz | 235/383 |
| 5,978,484 A | * | 11/1999 | Apperson et al. | 713/170 |
| 6,069,647 A | * | 5/2000 | Sullivan et al. | 725/29 |
| 6,189,097 B1 | * | 2/2001 | Tycksen et al. | 713/156 |
| 6,292,569 B1 | * | 9/2001 | Shear et al. | 713/155 |
| 6,321,339 B1 | | 11/2001 | French et al. | 713/201 |
| 2002/0116367 A1 | | 8/2002 | Brown et al. | |
| 2002/0120848 A1 | * | 8/2002 | Mont et al. | 713/175 |

FOREIGN PATENT DOCUMENTS

| | | |
|---|---|---|
| EP | 0 869 637 | 10/1998 |
| GB | 2 357 225 | 6/2001 |
| WO | 99/19845 | 4/1999 |
| WO | 01/06727 | 1/2001 |
| WO | 01/33797 | 5/2001 |

OTHER PUBLICATIONS

Housley et al., "Internet X.509 Public Key Infrastructure Certificate and CRL Profile," The Internet Society (1999), pp. 1-105, Feb. 2, 2002, ftp://ftp.isi.edu/in-notes/rfc2459.txt.

* cited by examiner

*Primary Examiner*—Gilberto Barron, Jr.
*Assistant Examiner*—Laurel Lashley
(74) *Attorney, Agent, or Firm*—Foley & Lardner LLP

(57) ABSTRACT

The present invention provides a digital certificate (2, 32), the certificate comprising a credential attribute function (6, 38) associated with a credential attribute property (5, 36), which credential attribute function is embedded in the certificate as an executable file, in which the credential attribute function can determine the value (12, 44) of the credential attribute property at least partly by execution of the executable file. A corresponding method is also disclosed.

22 Claims, 2 Drawing Sheets

DIGITAL CERTIFICATES

FIELD OF THE INVENTION

The present invention relates to digital certificates and to methods of communication.

BACKGROUND OF THE INVENTION

A credential is a data structure provided to a bearer for a purpose, with some acknowledged way to verify the bearer's right to use the credential. A credential relates to an attribute, normally, but not necessarily, of the bearer. A credential is verified by a trusted source (sometimes referred to as the verifier). Often, there will be a chain of credentials and respective trusted sources until a verification is proffered by an organisation in which trust is implicit. Credentials are incorporated in a digital certificate for verification.

A digital certificate generally comprises a file containing information, which file is transmitted to a recipient together with a digitally signed version thereof. The digitally signed version is a hash of the file encrypted using a secret key (in a public key infrastructure). A hash is a one-way function that generates a substantially unique output from a file and is for all practical purposes irreversible. These concepts are familiar to those skilled in the art.

Digital certificates are used in communication using distributed electronic networks, such as the internet, to transmit a credential, typically of the bearer. A known digital certificate is the X0.509 standard.

A certificate may contain one or more credential attributes.

A credential attribute in a certificate can be almost anything. Typical examples relevant to the present invention may be a credit rating, an access authorisation (for physical or electronic access), a verification of identity etc.

Each attribute has at least one attribute property, such as a value (e.g. a numeric or alphanumeric) or something more complex such as an indication of trust.

Generally, known digital certificates are valid for a fixed period of time (e.g. 1 year), during which time they will be used as a means of authentication and for gaining authorised access to services etc. This is referred to as the valid period. Such digital certificates can, however, be revoked at any time by the verifier (terminating the valid period), thus placing a burden on the certificate recipient to check revocation lists or to use online certificate status protocol services. These certificates are generally valid or not valid; there is no middle ground even though the degree of trust the trusted source has in the credential attribute may, in fact, vary over time (or some other variable) or if there is a wish to vary the credential attribute value.

A certificate may still be in a valid period even if a credential attribute within it is not.

By way of example, a certificate may specify an individual's credit limit as a credential attribute.

While this may be correct at the time of generation of the certificate, within the typical one year limit of the certificate, the verifier may not wish to attest to the same credit limit for the full period.

In another example a credential attribute may allow entry to a building which a certificate provider may wish to restrict to certain days.

SUMMARY OF THE INVENTION

Preferred embodiments of the present invention aim to address the problems referred to above.

According to the present invention in a first aspect, there is provided a digital certificate, the certificate comprising a credential attribute function associated with a credential attribute property, which credential attribute property can have a plurality of values, which credential attribute function is embedded in the digital certificate as an executable file, in which the credential attribute function can determine the value of the credential attribute property at least partly by execution of the executable file.

Thus, the digital certificate can be used locally and dynamically to determine a credential attribute property.

Suitably, there is provided a digital certificate comprising a credential attribute and at least one credential attribute property, the certificate having a valid period, and a credential attribute function associated with the at least one credential attribute property, which function determines the value of the credential attribute property within the valid period.

The "property" value need not be a numerical value, though generally it will be so. Numerical property values may relate to a numerical attribute, e.g. a credit rating, or be a numerical representation of a confidence level in a particular credential attribute e.g. that of identity of the bearer. Typically, for a confidence level, the value will be between a zero trust number (say '0' or '-1') and a full trust number (say '1') attributing a high confidence level to the credential.

Other values may be alphanumeric e.g. "YES"/"NO" outputs or relate to preset word based indications such as "HIGH TRUST", "MEDIUM TRUST" or "LOW TRUST".

By having the attribute function within the certificate it can be trusted by the recipient as a verified determination of the credential attribute property value.

Suitably, the credential attribute function varies the credential attribute property value as a function of time. The attribute function may be monotonically decreasing over time.

Suitably, the credential attribute function is configured to determine the credential attribute property value automatically. Suitably, execution of the executable file fully can determine the credential attribute property value. Suitably, the executable file is a platform portable code, such as Java Script or HTML.

Suitably, the credential attribute property comprises a value operated on by the credential attribute function to determine a credential attribute property value.

Suitably, the credential attribute function uses data obtained from outside the certificate to determine the credential attribute property value. Suitably, the obtained data is obtained from a user by the input of data in response to a query generated by the function. Suitably, the obtained data is obtained from a digital data store. Suitably, the digital data store is a web site.

Suitably, there is a plurality of credential attributes in the certificate. Suitably, there is a plurality of credential attribute properties in the certificate. Suitably, a plurality of the credential attribute properties have respective attribute functions. Suitably, each credential attribute property has a respective attribute function.

Suitably, the certificate has a valid period and the credential attribute function determines the value of the credential attribute property within the valid period.

According to the present invention in a second aspect, there is provided a digital certificate, the certificate comprising a credential attribute function with a credential attribute property, which credential attribute property can have a plurality of values, which credential attribute function is in the digital certificate as an executable program, in which the credential attribute function can at least in part by execution of the executable program determine the value of the credential attribute property.

According to the present invention in a third aspect, there is provided a digital certificate, the certificate comprising a credential attribute function with a credential attribute property, which credential attribute property can have a plurality of values, which credential attribute function is in the digital certificate as an executable file, in which the credential attribute function can at least in part by execution of the executable file determine the value of the credential attribute property automatically.

According to the present invention in a fourth aspect, there is provided a method of communication, which method comprises the steps of communicating from a sender to a recipient a digital certificate according to any of the first to third aspects of the invention.

Suitably, the recipient inspects the certificate and the credential attribute property value is determined according to the credential attribute function.

Suitably, the communication at least in part is via a distributed electronic network.

BRIEF DESCRIPTION OF THE DRAWINGS

The present invention will now be described, by way of example only, with reference to the drawings that follow; in which.

DETAILED DESCRIPTION OF THE EMBODIMENTS

Figure 1:
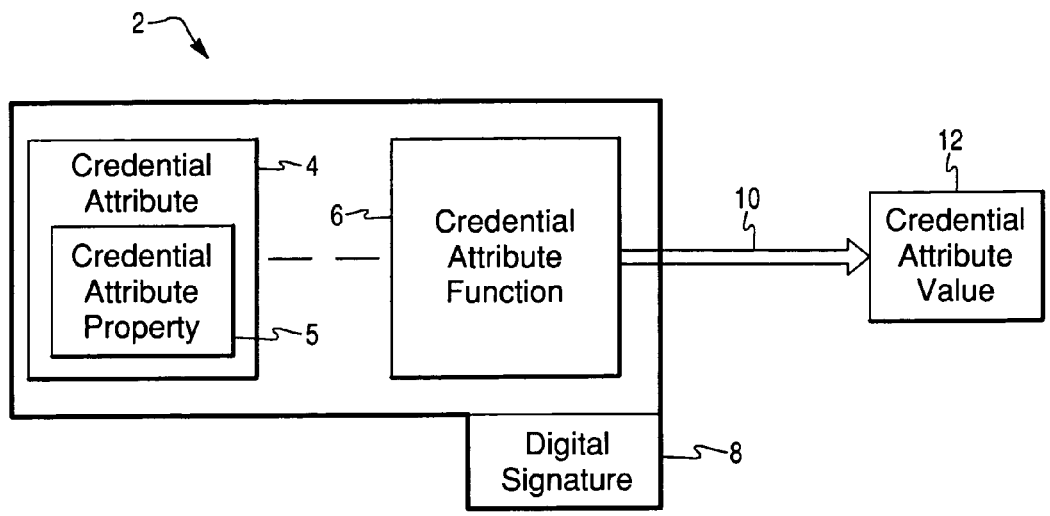
FIG. 1 is a schematic representation of a digital certificate according to a first embodiment of the present invention.

Referring to FIG. 1 of the drawings that follow there is shown, schematically, a digital certificate 2 according to the X0.509 standard, the certificate 2 containing a credential attribute 4, having a credential attribute property 5 and an associated credential attribute function 6. The certificate 2 is digitally signed (a hash created, which hash is encrypted using a verifier's secret key) as indicated at 8.

In the certificate 2, it will be appreciated that many of the fields present in an X0.509 certificate are not represented. These may include fields containing data to allow a credential attribute property value to be determined or evaluated according to the credential attribute function 6. For instance, these fields may include a credential start date.

The credential attribute function 6 is embedded in the certificate 2 as an executable file of platform portable code such as JavaScript or HTML.

Figure 2:
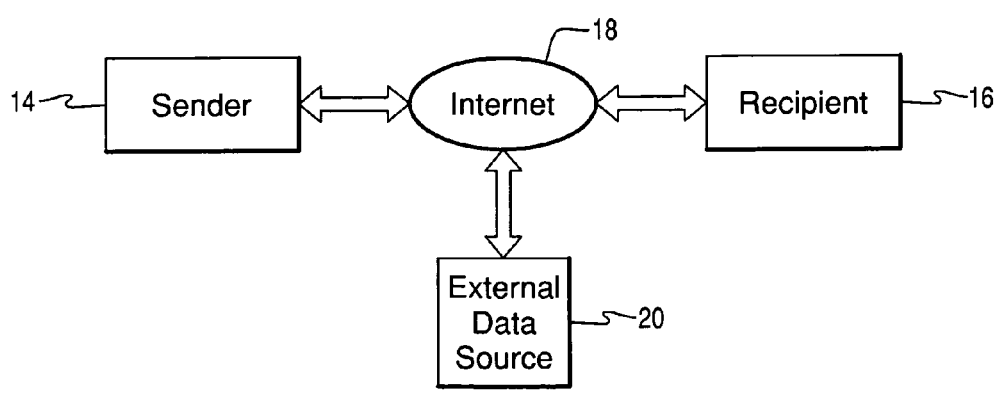
FIG. 2 is a schematic representation of a distributed electronic network over which the present invention may be used.

The certificate 2 is communicated via a distributed electronic network, such as the internet, as shown schematically in FIG. 2 of the drawings that follow, in which a sender 14 communicates with a recipient 16 via the internet, indicated schematically at 18. An external data source from which data can be obtained is indicated schematically at 20. Communication can be via other distributed electronic networks, such as Wide Area Networks (WANs) or Local Area Networks (LANs). Embodiments of the present invention can also be implemented in other, less preferred, ways, for instance by storing a certificate on a digital storage device (e.g. a floppy disk) and sending this to the recipient 16.

Upon receipt of the digital certificate 2, the recipient 16 inspects the digital signature 8 to verify the certificate 2. Having done so, the recipient 16 executes the credential attribute function 6 which operates on the credential attribute property 5 (indicated schematically at 10) to determine a credential attribute value 12. The executable file is executed to determine credential attribute value 12. The determined credential attribute value 12 becomes the credential attribute value 12 for the recipient 16.

By way of example, the credential attribute property may be a credit rating for a bearer of the certificate. The credit limit in the credential attribute property may be, say, £10,000. The function 6, in this case, is a modifier of the credential attribute value 12. Pursuing the example of the credit rating, the function 6 may be to reduce the rating by 10% of the original rating for each month. Applying the function 6 to the attribute value 4 above, the function obtains date information and in the second month the credential attribute value 4 is determined as £9,000 and so on. Date information may be obtained from the recipient computer or, for more security, from a trusted source, preferably a trusted source web site. These are digital data sources.

In another example the credential attribute property 4 may be an access authorisation for a building to which the provider of the certificate 2 only wishes to allow the certificate bearer access on specified times, say week days only. The credential attribute property 4 would have a value of "PERMIT ACCESS" in this case. The function 6 is, therefore, encoded to determine the day of the week (for instance from a computer on which the certificate 2 is being verified, or from a remote web-site) and generate a modified credential attribute property value which is "DO NOT PERMIT ACCESS" at week ends. It will be appreciated from this that the credential attribute property 4 will not always be modified by function 6.

Alternatively, the credential attribute property 4 may not have an original value in the certificate. Instead, it may solely be generated by a credential attribute function which (generally) obtains data externally of the certificate.

Figure 3:
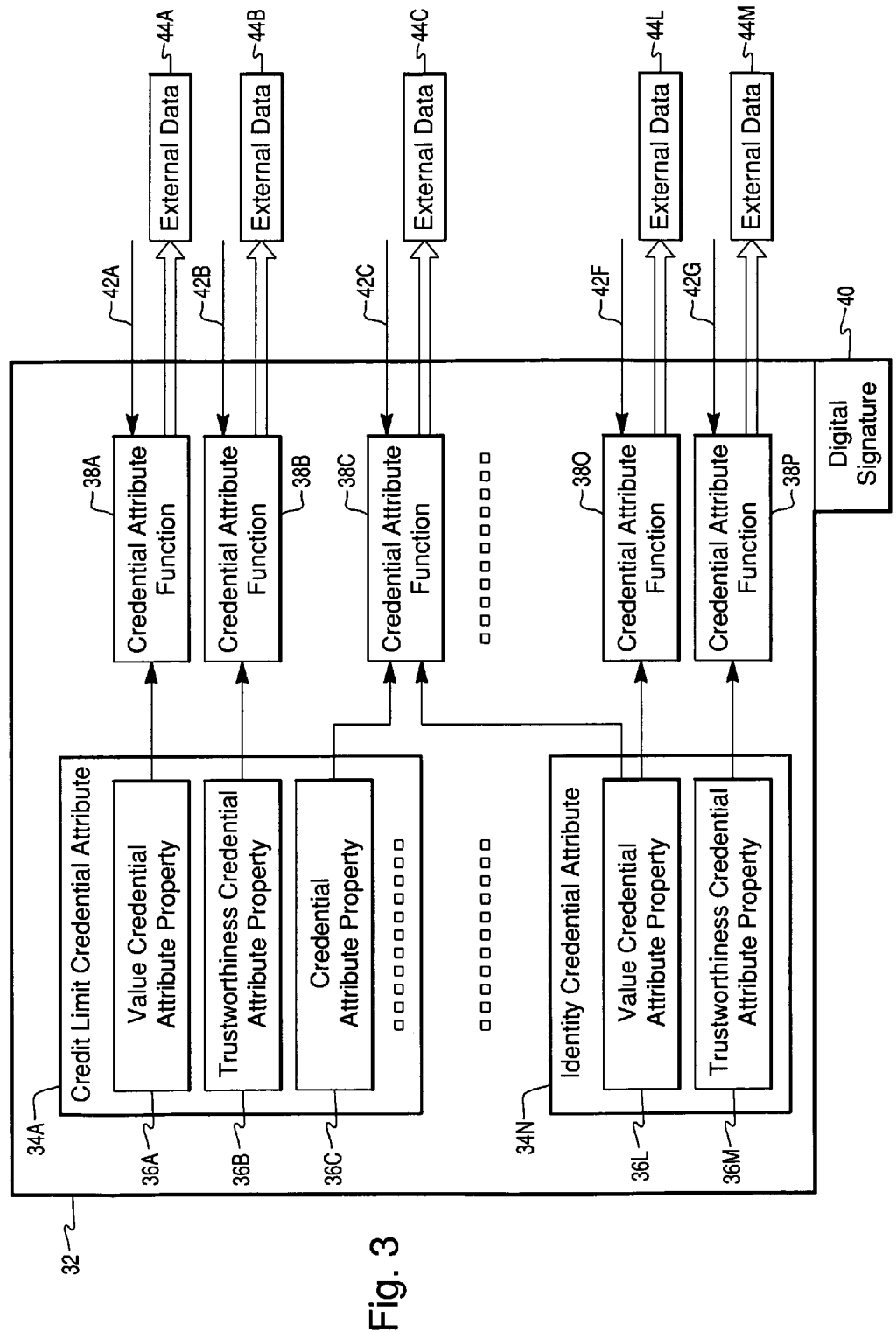
FIG. 3 is a schematic representation of a digital certificate according to a second embodiment of the present invention.

Referring to FIG. 3 of the drawings that follow, there is shown a schematic representation of a digital certificate 32 corresponding to digital certificate 2 of FIG. 1, except that in digital certificate 32 there is a plurality of credential attributes 34A–34N with associated credential attribute properties 36A–36M and corresponding credential attribute functions 38A–38P. The certificate 32 is signed, as indicated at 40.

In this example credential attribute 34A is a credit limit, having properties of a value 36A and an indication of trustworthiness 36B. Other properties 36C etc may be included. Credential attribute 34N is an identity having a value 36L and an indication of trustworthiness 36M.

Each function 38A–38P is capable of modifying a respective credential attribute property 36A–36M to determine a respective credential attribute property value 42A–42M obtaining external data as required as indicated at 44A–G.

There may be a one-to-one correlation between each credential attribute property 34A–34N and its corresponding function 36A–36N, though this need not be the case. For instance, one or more, but not necessarily all, of the credential attribute properties 34A–34N need have a credential attribute function 36 for generation thereof. Further, a given credential attribute function 38A–38P may be used for a plurality of credential attribute properties 34A–34N, in which case there may be fewer functions 36 than credential attribute properties 34.

Thus the certificate may provide the recipient with credential attribute property values relevant to a plurality of attributes therein.

The function can seek information from elsewhere on which to base its generation of the credential attribute property value. For instance, the function 6 can access local time data or extract data from a web-site as required, as described above. Alternatively, in a less preferred option, data can be sought from the recipient of the certificate in response to an enquiry generated by the credential attribute function. This option is less preferred as it makes the certificate less self-contained.

The function 6 may obtain all its data for producing the credential attribute property value from external of the certificate.

Thus, the function within the certificate can operate automatically to produce a credential attribute property which can vary over time an dynamically according to external data. A certification authority need not be involved in the variation of the credential attribute property after issue, though optionally they may be.

The digital certificate may, optionally, be encrypted.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A digital certificate embodied on a computer readable medium executable on a computing system, the certificate comprising:
a credential attribute function associated with a credential attribute property, which credential attribute property can have a plurality of values, which credential attribute function is embedded in the digital certificate as an executable program file, in which the credential attribute function can determine the value of the credential attribute property at least partly when the executable program file is executed.

2. A digital certificate according to claim 1, in which there is provided a digital certificate comprising a credential attribute and at least one credential attribute property, the digital certificate having a valid period, and a credential attribute function associated with at least one credential attribute property, which function determines the value of the credential attribute property within the valid period.

3. A digital certificate according to claim 1, in which the credential attribute function varies the credential attribute property value as a function of time.

4. A digital certificate according to claim 3, in which the credential attribute function is monotonically decreasing over time.

5. A digital certificate according to claim 1, in which the credential attribute function is configured to determine the credential attribute property value automatically.

6. A digital certificate according to claim 1, in which execution of the executable program file fully can determine the credential attribute property value.

7. A digital certificate according to claim 1, in which the executable program file is a platform portable code.

8. A digital certificate according to claim 1, in which the credential attribute property comprises a value operated on by the credential attribute function to determine a credential attribute property value.

9. A digital certificate according to claim 1, in which the credential attribute function uses data obtained from outside the digital certificate to determine the credential attribute property value.

10. A digital certificate according to claim 9, in which the data obtained is obtained from a user by the input of data in response to a query generated by the credential attribute function.

11. A digital certificate according to claim 9, in which the data obtained is obtained from a digital data store.

12. A digital certificate according to claim 11, in which the digital data store is a web site.

13. A digital certificate according to claim 1, in which there is a plurality of credential attributes in the digital certificate.

14. A digital certificate according to claim 1, in which there is a plurality of credential attribute properties in the digital certificate.

15. A digital certificate according to claim 14, in which a plurality of the credential attribute properties have respective attribute functions.

16. A digital certificate according to claim 15, in which each credential attribute property has a respective attribute function.

17. A digital certificate according to claim 1, in which the digital certificate has a valid period and the credential attribute function determines the value of the credential attribute property within the valid period.

18. A digital certificate embodied on a computer readable medium executable on a computing system, the certificate comprising:
a credential attribute function with a credential attribute property, which credential attribute property can have a plurality of values, which credential attribute function is in the digital certificate as an executable program file, in which the credential attribute function can at least in part, when the executable program file is executed, determine the value of the credential attribute property.

19. A digital certificate embodied on a computer readable medium executable on a computing system, the certificate comprising:
a credential attribute function with a credential attribute property, which credential attribute property can have a plurality of values, which credential attribute function is in the digital certificate as an executable program file, in which the credential attribute function can at least in part, when the executable program file is executed, determine the value of the credential attribute property automatically.

20. A method of communication, which method comprises the steps of communicating from a sender to a recipient a digital certificate according to claim 1.

21. A method of communication according to claim 20, in which the recipient inspects the digital certificate and the credential attribute property value is determined according to the credential attribute function.

22. A method of communication according to claim 20, in which the communication at least in part is via a distributed electronic network.

* * * * *